United States Patent
Galimberti et al.

(10) Patent No.: US 6,221,992 B1
(45) Date of Patent: *Apr. 24, 2001

(54) ELASTOMERIC COPOLYMERS OF ETHYLENE WITH ALPHA-OLEFINS AND PROCESS FOR THEIR PREPARATION

(75) Inventors: Maurizio Galimberti, Milan; Luigi Resconi, Ferrara; Enrico Albizzati, Arona, all of (IT)

(73) Assignee: Montell Technology Company bv (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/876,865

(22) Filed: Jun. 16, 1997

Related U.S. Application Data

(63) Continuation of application No. 08/479,045, filed on Jun. 6, 1995, now abandoned, which is a continuation of application No. 08/239,711, filed on May 9, 1994, now abandoned.

(30) Foreign Application Priority Data

Jun. 30, 1993 (IT) .............................................. MI93A1405

(51) Int. Cl.[7] .................................................. C08F 210/06
(52) U.S. Cl. .......................... 526/348; 526/352; 526/351; 526/160; 526/170; 526/943; 526/127; 526/153; 502/152
(58) Field of Search .................................... 526/127, 153, 526/160, 335, 336, 348, 352, 351, 170, 943; 502/152

(56) References Cited

U.S. PATENT DOCUMENTS

| | | | |
|---|---|---|---|
| 5,001,205 | 3/1991 | Hoel | 526/128 |
| 5,252,529 * | 10/1993 | Ueda et al. | 502/113 |
| 5,292,845 * | 3/1994 | Kawasaki | 526/336 |
| 5,436,305 * | 7/1995 | Alt et al. | 526/160 |

FOREIGN PATENT DOCUMENTS

| | | |
|---|---|---|
| 0 426 645 | 5/1991 | (EP) . |
| 0 524 624 | 1/1993 | (EP) . |
| 93/19107 | 9/1993 | (WO) . |
| 93/25591 | 12/1993 | (WO) . |

OTHER PUBLICATIONS

Chien, J.C. et al, "Olefin Copolymerization and Olefin/Diene Terpolymerization with a Zir. Catalyst System" Makromol. che. Rapid Commun. 14, 109–114 (1993).

* cited by examiner

*Primary Examiner*—David W. Wu
*Assistant Examiner*—Ling-Siu Choi
(74) *Attorney, Agent, or Firm*—Bryan Cave LLP; Maurice B. Stiefel

(57) ABSTRACT

Amorphous copolymers of ethylene with propylene, and optionally with minor amounts of polyenes, have the following characteristics:

(A) the % content by mole of propylene in the copolymer (%P) and the triads ratio EPE/(EPE+PPE+PPP) satisfy the following relationship:
0.01%P+EPE/(EPE+PPE+PPP)≧1

(B) less than 2% of the $CH_2$ groups in the chain are in sequences $(CH_2)_n$, wherein n is an even number. These copolymers are obtainable by operating in the presence of particular metallocene catalysts having two fluorenyl groups joined together through a bridging group.

7 Claims, 1 Drawing Sheet

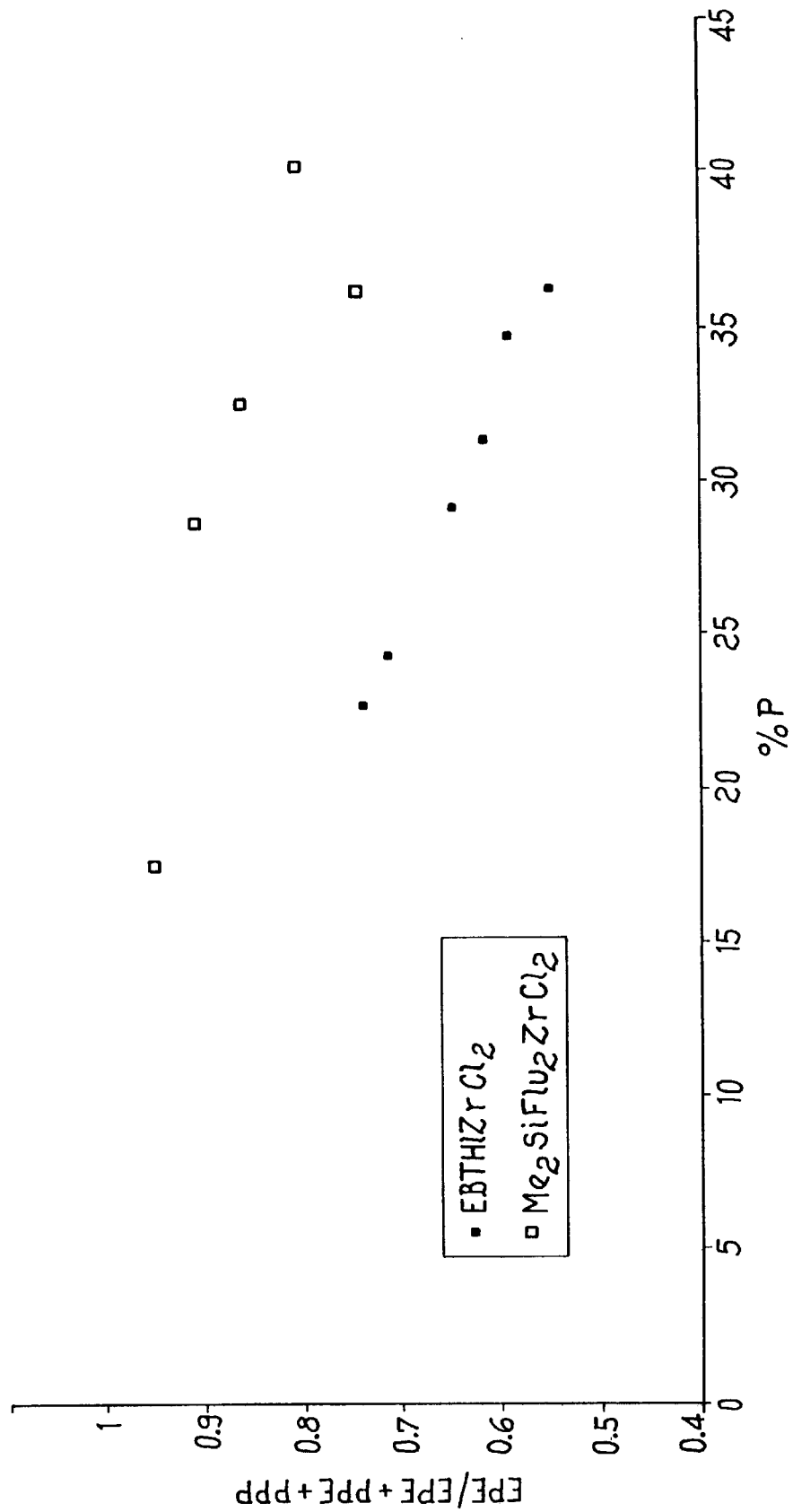

ELASTOMERIC COPOLYMERS OF ETHYLENE WITH ALPHA-OLEFINS AND PROCESS FOR THEIR PREPARATION

This is a continuation of U.S. application Ser. No. 08/479,045, filed Jun. 6, 1995, now abandoned, which was a continuation of U.S. application Ser. No. 08/239,711, filed May 9, 1994, now abandoned.

The present invention relates to copolymers of ethylene with propylene, optionally with a minor amount of polyenes, and to the process for their preparation.

BACKGROUND OF THE INVENTION

Copolymers of ethylene with one or more α-olefins and optionally a minor amount of polyenes are known which, after vulcanization exhibit elastomeric type properties. The most common of these are copolymers of ethylene with propylene (EPR), which can contain small amounts of a non-conjugated diene monomer (EPDM).

Thanks to their good resistance to high temperatures, chemical and atmospheric agents, and their dielectric properties, these elastomers find uses in various application fields. Principally they can be used as additives for lubricating oils, covering materials in building, electric insulators, components in the automotive industry or modifiers in mixtures with thermoplastic polymers.

The above mentioned ethylene copolymers are generally prepared in the presence of Ziegler-Natta catalysts. The copolymers so obtained have a high tendency to produce blocks of propylenic units in the chain, and this gives rise to crystallinity negatively influencing the final characteristic of the product. Therefore, in order to obtain vulcanized copolymers which are endowed with good elastomeric properties, it is important that the distribution of the propylenic units within the chain is as homogenous as possible.

More recently, these ethylene copolymers have been prepared in the presence of homogeneous catalysts obtained from metallocenes and aluminoxane compounds.

U.S. Pat. No. 5,001,205, for example, describes a process for the preparation of elastomeric copolymers of ethylene with an α-olefin, particularly with propylene, in which the product obtained from the reaction of methylaluminoxane (MAO) with a bis cyclopentadiene of Zr, Ti, or Hf, such as bis(tetrahydroindenyl)zirconium dichloride, ethylene-bis (tetrahydroindenyl)zirconium dichloride, or dimethylsilandiyl-bis(tetrahydroindenyl)zirconium dichloride is used as a catalyst.

The homogeneity of the distribution of the propylenic units in the copolymer that is obtained operating in the presence of these types of catalyst, although turning out improved with respect to the copolymers obtained from Ziegler-Natta catalysts, is still not totally satisfactory.

SUMMARY OF THE INVENTION

Hence, it would be extremely advantageous to obtain copolymers of ethylene with propylene, and optionally with minor amounts of polyenes, in which the homogeneity of the distribution of the propylenic units is sensibly improved.

It has been unexpectedly found that, by carrying out the polymerization reaction in the presence of particular metallocene catalysts it is possible to prepare ethylene/propylene copolymers or ethylene/propylene/diene terpolymers in which the distribution of comonomers in the polymeric chain is extremely homogeneous.

It is therefore an object of the present invention a copolymer of ethylene with propylene, optionally with one or more polyenes, having a content of ethylene derived units comprised between about 35 and 85% by mole, a content of propylene derived units comprised between about 10 and 60% by mole and a content of polyene derived units comprised between about 0 to 5% by mole, having the following characteristics:

(A) the % by mole content of propylene in the copolymer (%P) and the ratio EPE/(EPE+PPE+PPP), wherein EPE, PPE and PPP represent the sequences ethylene/propylene/ethylene, propylene/propylene/ethylene and propylene/propylene/propylene respectively in the copolymer, satisfy the following relationship:
0.01%P+EPE/(EPE+PPE+PPP)≧1

(B) less than 2% of the $CH_2$ groups in the polymeric chain are in sequences $(CH_2)_n$, wherein n is an even number.

Another object of the present invention is an elastomeric copolymer obtainable by subjecting the above said copolymer to a vulcanization process.

Still another object of the present invention is a shaped article obtained from an elastomeric copolymer according to the invention.

A further, object of the present invention is a process for the preparation of the above said copolymers of ethylene.

BRIEF DESCRIPTION OF THE DRAWING

The FIGURE illustrates the triads ratio of EPE/(EPE+PPE+PPP) as a function of the percentage molar content of propylene in the chain (%P) for ethylene propylene copolymers.

DETAILED DESCRIPTION OF THE INVENTION

The molar content of ethylene derived units is preferably comprised between about 50% and 85% and, more preferably, between about 60% and 80%.

The molar content of propylene derived units is preferable comprised between about 15% and 50% and, more preferably, between about 20% and 40%.

The molar content of polyene derived units is preferably comprised between about 0% and 4% and, more preferably, between about 0% and 3%.

The polyenes which can be used as comonomers in the copolymer of the invention are comprised in the following classes:

non-conjugated diolefins capable of cyclopolymerization such as, for example, 1,5-hexadiene, 1,6-heptadiene, 2-methyl-1,5-hexadiene;

dienes capable of giving unsaturated monomeric units, in particular conjugated dienes such as, for example, butadiene and isoprene, and linear non-conjugated dienes such as, for example, trans 1,4-hexadiene, cis 1,4-hexadiene, 6-methyl-1,5-heptadiene, 3,7-dimethyl-1,6-octadiene, 11-methyl-1,10-dodecadiene.

The copolymers according to the present invention with a high content of ethylene derived units are substantially void of crystallinity. Their melting enthalpy ($\Delta H_f$) are lower than about 20 J/g and, preferably, lower than about 10 J/g. Generally they can be considered completely amorphous, having a melting enthalpy of 0 J/g.

The copolymers according to the invention in which the content of ethylene derived units is close to the upper limit of 85% by mole, have melting enthalpy which can be higher than 20 J/g.

The copolymers according to the invention are characterised by an extremely homogenous distribution of the comonomers in the polymeric chain and, more precisely, by the fact of containing an extremely low number of sequences of two or more consecutive propylenic units, and anyway lower than the copolymers known at the date of the present invention.

The analysis of the distribution of the propylenic units in the copolymers of the invention has been carried out using $^{13}$C-N.M.R. The assignments were carried out as described by M. Kagugo et al. in "Macromolecules, 15, 1150–1152 (1982)". The distribution of triads are calculated by the following relationship:

$$EPE=T_{\delta\delta} \quad PPE=T_{\beta\delta} \quad PPP=T_{\beta\beta}$$

wherein EPE, PPE and PPP represent the sequences ethylene/propylene/ethylene, propylene/propylene/ethylene and propylene/propylene/propylene respectively in the copolymer. The values are normalized. The higher the number of isolated propylenic units in the chain, the more the values of the ratio EPE/(EPE+PPE+PPP) become closer to the unit.

The number of propylene sequences appears to be dependent on the amount of propylenic units present in the chain.

In particular, the percentage molar content of propylene in the copolymer (%P) and the ratio EPE/(EPE+PPE+PPP) satisfy the following relationship:

$$0.01\%P+EPE/(EPE+PPE+PPP) \geq 1$$

preferably:

$$0.008\%P+EPE/(EPE+PPE+PPP) \geq 1$$

more preferably:

$$0.006\%P+EPE/(EPE+PPE+PPP) \geq 1$$

In the FIGURE, there are reported the ratios EPE/(EPE+PPE+PPP) as a function of the percentage molar content of propylene in the chain (%P) for ethylene/propylene copolymers obtained with a process according to the present invention, in the presence of dimethylsilandiyl-bis (fluorenyl) zirconium dichloride ($Me_2SiFlu_2ZrCl_2$), and for copolymers obtained in the presence of ethylene-bis(4,5,6,7-tetrahydroindenyl)zirconium dichloride ($EBTHIZrCl_2$). The amounts of propylenic units being equal, the values of the ratio EPE/(EPE+PPE+PPP) for the copolymers of the invention are always higher than those for the other polymers, as demonstrated by the improved distribution of propylenic units in the chain.

In the copolymers according to the present invention, the product of the reactivity ratios $r_1r_2$, wherein $r_1$ is the reactivity ratio of propylene and $r_2$ that of ethylene, calculated according to the following formula:

$$r_1 \cdot r_2 = 1 + f \cdot (\chi+1) - (f+1) \cdot (\chi+1)^{1/2},$$

wherein f=ratio between moles of ethylene units and moles of propylenic units in the copolymer, and $\chi$=(PPP+PPE)/EPE, appears to be extremely low. In particular, it is generally lower than 0.2, preferably lower than 0.15, more preferably lower than 0.1 and, even more preferably, lower than 0.08.

The copolymer structure according to the invention appears to be highly regioregular. In fact, from the $^{13}$C-N.M.R. analysis no signals are revealed as deriving from the $(CH_2)_n$ sequence where n is an even number. Preferably, less than 1% of the $CH_2$ groups in the chain are contained in a $(CH_2)_n$ sequence, where n is an even number.

The copolymers of the invention have intrinsic viscosity values (I.V.) generally higher than 1.0 dl/g and, preferably, higher than 1.5 dl/g. The intrinsic viscosity can reach values of 2.0 dl/g and higher.

Generally, the copolymers of the invention are endowed of a narrow molecular weight distribution. An indication of the molecular weight distribution is represented by the ratio $M_w/M_n$ which, for the copolymers of the invention, is generally lower than 4, preferably lower than 3.5 and, more preferably, lower than 3.

The copolymers of the invention are generally soluble in common solvents such as, for example, hexane, heptane and toluene.

The copolymers of the invention may be vulcanized using the known techniques and methods for the EPR and EPDM rubbers, operating, for example, in the presence of peroxide or sulfur. Rubbers are obtained having valuable elastomeric properties.

The rubbers obtained from the copolymers of the invention are transformable into shaped articles by the normal thermoplastic material processing (molding, extrusion, injection, etc.). The relative shaped articles are endowed with interesting elastomeric properties and find uses in all typical applications of the ethylene-based elastomers, such as EPR and EPDM.

In particular, the products obtained from copolymers according to the invention which have a high content of ethylene units, can be advantageously used as coatings for wires and cables.

The copolymers of the invention can be prepared through a process, which constitutes another object of the present invention, which process comprises the polymerization reaction of a mixture of ethylene, propylene and optionally one or more polyenes, in the presence of a catalytic quantity of a catalyst comprising the product of the reaction between:

(A) a compound of formula (I)

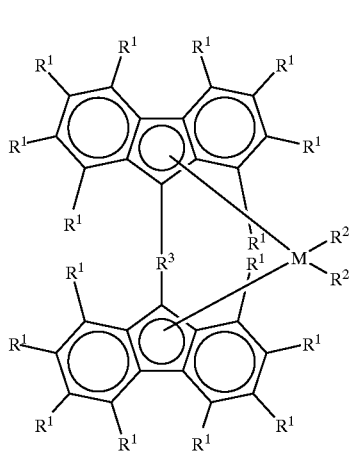

(I)

wherein substituents $R^1$, the same or different from each other, are hydrogen atoms, $C_1$–$C_{20}$ alkyl radicals, $C_3$–$C_{20}$ cycloalkyl radicals, $C_2$–$C_{20}$ alkenyl radicals, $C_6$–$C_{20}$ aryl radicals, $C_7$–$C_{20}$ alkylaryl radicals, or $C_7$–$C_{20}$ arylalkyl radicals, optionally two adjacent substituents $R^1$ can form a cycle comprising from 5 to 8 carbon atoms and, furthermore, substituents $R^1$ can contain Si or Ge atoms;

M is Ti, Zr or Hf;

substituents $R^2$, the same or different from each other, are halogen atoms, —OH, —SH, $R^1$, —$OR^1$, —$SR^1$, —$NR^1_2$ or $PR^1_2$, wherein $R^1$ is defined as above;

the group $R^3$ is selected from >$CR^1_2$, >$SiR^1_2$, >$GeR^1_2$, >$NR^1$ or >$PR^1$, wherein $R^1$ is defined as above and optionally, when $R^3$ is $>CR^1_2$, $>SiR^1_2$ or $>GeR^1_2$, both substituents $R^1$ can form a cycle comprising from 3 to 8 atoms, optionally as reaction product with an aluminium organo-metallic compound of formula $AlR^4_3$ or $Al_2R^4_6$, wherein substituents $R^4$, the same or different from each other, are $R^1$ or halogen, and (B) an alumoxane, optionally mixed with an aluminium organo-metallic compound of formula $AlR^4_3$ or $Al_2R^4_6$, wherein substituents $R^4$, the same or different from each other, are defined as above, or one or more compounds able to give a metallocene alkyl cation.

The alumoxane used as component (B) can be obtained by reaction between water and an organometallic compound of aluminium of formula $AlR_3$ or $Al_2R^4_6$, wherein substituents $R^4$, the same or different from each other, are defined as above, with the provision that at least one $R^4$ is different from halogen. In that case, these are reacted in molar ratios Al/water comprised between about 1:1 and 100:1.

The molar ratio between aluminium and the metal of the metallocene is comprised between about 10:1 and about 5000:1, and preferably between 100:1 and 4000:1.

Metallocenes of formula (I) particularly suitable are those wherein M=Zr, substituents $R^1$ are hydrogen atoms, substituents $R^2$ are chlorine or methyl groups, and the group $R^3$ is a radical $>Si(CH_3)_2$ such as, for example, dimethylsilandiylbis(fluorenyl)zirconium dichloride.

The alumoxane used in the catalyst according to the invention is a linear, branched or cyclic compound, containing at least one group of the type:

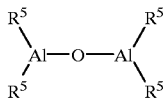

wherein substituents $R^5$, the same or different from each other, are $R^1$ or a group $-O-Al(R^5)_2$, and optionally some $R^5$ can be halogen or hydrogen atoms.

In particular, it is possible to use alumoxanes of formula:

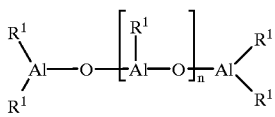

in the case of linear compounds, wherein n is 0 or an integer comprised between 1 and 40, or alumoxanes of formula:

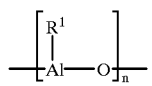

in the case of cyclic compounds, wherein n is an integer comprised between 2 and 40.

Radicals $R^1$ are preferably methyl, ethyl or isobutyl. Examples of alumoxanes suitable for the use according to the present invention are methylalumoxane (MAO) and isobutylalumoxane (TIBAO).

Nonlimiting examples of aluminium compounds of formula $AlR_3$ or $Al_2R^4_6$ are:

| | | | |
|---|---|---|---|
| Al(Me)$_3$, | Al(Et)$_3$, | AlH(Et)$_2$, | Al(iBu)$_3$, |
| AlH(iBu)$_2$, | Al(iHex)$_3$, | Al(C$_6$H$_5$)$_3$, | Al(CH$_2$C$_6$H$_5$)$_3$, |
| Al(CH$_2$CMe$_3$)$_3$, | Al(CH$_2$SiMe$_3$)$_3$, | Al(Me)$_2$iBu, | Al(Me)$_2$Et, |
| AlMe(Et)$_2$, | AlMe(iBu)$_2$, | Al(Me)$_2$iBu, | Al(Me)$_2$Cl, |
| Al(Et)$_2$Cl, | AlEtCl$_2$, | Al$_2$(Et)$_3$Cl$_3$, | | wherein Me = methyl, Et = ethyl, iBu = isobutyl, iHex = isohexyl.

Among the above mentioned aluminium compounds, trimethylaluminium and triisobutylaluminium are preferred.

Nonlimiting examples of compounds able to form a metallocene alkyl cation are compounds of formula $Y^+Z^-$, wherein $Y^+$ is a Bronsted acid, able to give a proton and to react irreversibly with a substituent $R^2$ of the metallocene of formula (I), and $Z^-$ is a compatible anion, which does not coordinate, which is able to stabilize the active catalytic species which originates from the reaction of the two compounds and which is sufficiently labile to be able to be removed from an olefinic substrate. Preferably, the anion $Z^-$ comprises one or more boron atoms. More preferably, the anion $Z^-$ is an anion of the formula $BAr^{(-)}_4$, wherein substituents Ar, the same or different from each other, are aryl radicals such as phenyl, pentafluorophenyl, bis(trifluoromethyl)phenyl. Particularly preferred is the tetrakis-pentafluorophenyl borate. Furthermore, compounds of formula $BAr_3$ can be suitably used.

The catalysts used in the process of the present invention can be also used on inert supports. This is obtained by depositing the metallocene (A), or the product of the reaction of the same with the component (B), or the component (B) and thereafter the metallocene (A), on inert supports such as for example silica, alumina, styrene-divinylbenzene copolymers or polyethylene.

The solid compound thus obtained, combined with a further addition of alkylaluminium compound either as such or prereacted with water, if necessary, is usefully used in the gas phase polymerization.

The process of copolymerization of ethylene in the presence of the above described catalysts can be carried out in liquid phase, in the presence or not of an inert aromatic hydrocarbon solvent such as, for instance, toluene, or aliphatic such as, for instance, n-hexane, or in gas phase.

The polymerization temperature is generally comprised between 0° C. and 150° C., in particular between 20° C. and 100° C., and more particularly between 30° C. and 80° C.

The molecular weight of the copolymers can be varied merely by varying the polymerization temperature, the type or the concentration of the catalytic components or by using molecular weight regulators such as, for example, hydrogen.

The molecular weight distribution can be changed using mixtures of different metallocenes, or carrying out the polymerization in more steps differing as to polymerization temperatures and/or concentrations of the molecular weight regulator.

Polymerization yields depend on the purity of the metallocene component of the catalyst. Therefore, metallocenes obtained from the process of the invention can be used either as such or subjected to purification treatments.

The components of the catalyst can be contacted among them before the polymerization. The contact time is generally comprised between 1 and 60 minutes, preferably between 5 and 20 minutes.

The following examples are given to illustrate and not limit the invention.

CHARACTERIZATIONS

The content of propylene in the copolymer and the amount of isolated propylenic units in the chain have been determined by $^{13}$C-N.M.R analysis.

The $^{13}$C-N.M.R.analysis of the copolymer have been carried out with a Bruker AC200 instrument, at a temperature of 120° C., on samples prepared by dissolving about 300 mg of polymer in 2.5 cc of a 3:1 mixture of trichlorobenzene/$C_2D_2Cl_4$. The spectra have been registered with the following parameters:

Relaction delay=12 sec,

Number of scans=2000÷2500.

The Differential Scanning Calorimetry (DSC) measurements were carried out on an apparatus DSC-7 of Perkin-Elmer Co. Ltd. according to the following procedure. About 10 mg of sample were heated at 200° C. with a scanning speed equal to 10° C./minute. The sample was kept at 200° C. for 5 minutes and thereafter was cooled with a scanning speed equal to 10° C./minute. Thereafter a second scanning was carried out according to the same modalities of the first one. The values reported are those obtained in the first scanning.

The intrinsic viscosity [η] was measured in tetraline at 135° C.

PREPARATION OF THE CATALYST COMPONENTS

Dimethylsilandiylbis(fluorenyl)zirconium dichloride (DMSBF)

(a) Synthesis of the Ligand

To a solution obtained by dissolving 50 g (0.30 mols) of fluorine in 400 ml of tetrahydrofuran (THF), maintained under stirring at a temperature of 0°C., 120 ml (0.30 mols) of a solution of n-butyllithium 2.5 M in hexane were added dropwise. Once the addition was completed, the solution was brought to a room temperature and maintained under stirring for a further 5 hours until there was no further evolution of gas.

The solution so obtained, containing fluorine anions, was added dropwise to a solution obtained by dissolving 19.4 g (0.15 mols) of dimethyldichlorosilane in 100 ml of THF, maintaining under stirring at a temperature of 0° C. Once completed the addition, the solution was brought to room temperature and maintained under stirring for a further 17 hours.

The reaction was been interrupted by the addition of 150 ml of water and the organic layer was dried under magnesium sulfate. Then, after removing the solvents, a vacuum was applied and the solids so collected were recrystallized from hexane.

37.8 g of dimethylbisfluorenylsilane of formula $(CH_3)_2Si(Flu)_2$, wherein Flu=fluorenyl, were obtained, the structure and chemical purity of which was confirmed by GC-MS and $^1$H-NMR.

(b) Metallocene Synthesis

To a solution prepared by dissolving 8.5 g (0.0219 mols) of the ligand $(CH_3)_2Si(Flu)_2$ obtained at point (A) in 75 ml of diethylether ($Et_2O$), maintained under stirring at a temperature of 0° C., 31.25 ml of a solution of methyllithium 1.4 M in $Et_2O$ were added dropwise. Once the addition was completed the suspension obtained was brought to room temperature and maintained under stirring for a further 5 hours until there was no further evolution of gas.

Then the suspension was subjected to filtration, obtaining a bright yellow powder which was washed with $Et_2O$ and pentane.

The ligand dianion so obtained was re-suspended in 100 ml of $Et_2O$ and then added dropwise to a suspension of 5.1 g (0.0219 mole) of $ZrCl_4$ in 150 ml of pentane maintained under rapid stirring at a temperature of −78° C.

Once the addition was completed the suspension obtained was brought to room temperature and maintained under stirring for a further 17 hours.

Then the suspension was dried and 13.56 g of product were obtained.

Ethylene-bis(tetrahydroindenyl)zirconium dichloride (EBTHI)

It was prepared according to the method described in "H. H. Brintzinger et al., J. Organomet. Chem., 288, p.63 (1985)".

Tetraisobutyldialuminoxane (TIBAO)

It was prepared according to Example 2 of EP-A-384171.

POLYMERIZATIONS

EXAMPLES 1–2

In a 4.25 liter autoclave equipped with a stirrer, manometer, temperature indicator, system for loading the catalyst, monomer feed lines and a thermostating jacket, purged with ethylene at 80° C., 2 liters of n-hexane and the amount of water, propylene and ethylene reported in Table 1 were loaded at room temperature. The autoclave was then brought to a temperature of 5° C. lower than the polymerization temperature.

The catalyst solution was prepared as follows. A solution of TIBAL in toluene (0.2 gr TIBAL/ml solution) was added to a solution of DMSBF in toluene (3 ml toluene/mg metallocene). This was maintained under stirring at a temperature of 20° C. for 5 minutes, then the solution was injected into the autoclave under a pressure of an ethylene/propylene mixture in a ratio such to maintain in solution the relative concentrations as reported above. The temperature was then rapidly brought to values required for polymerization.

The polymerization conditions are reported in Table 1.

The polymer obtained was isolated by removing non-reacted monomers, and then dried under vacuum.

The characterization data of the polymer obtained are reported in Table 2.

In the $^{13}$C-N.M.R. spectra no peak revealing the presence of the —$(CH_2)_n$— sequence comprised between two tertiary carbon atoms, where n is an even number, was observed.

EXAMPLE 3

It was worked according to the procedure described in Example 1, but with the difference that a 1.35 l autoclave was used in which 700 ml of n-hexane was introduced.

The polymerization conditions are reported in Table 1. The characterization data of the polymer obtained are reported in Table 2.

In the $^{13}$C-N.M.R. spectra no peak revealing the presence of the —$(CH_2)_n$— sequence comprised between two tertiary carbon atoms, wherein n is an even number, was observed.

EXAMPLE 4

It was worked according to the procedure described in Example 3, but in the absence of water and using TIBAO instead of TIBAL.

The polymerization conditions are reported in Table 1. The characterization data of the polymer obtained are reported in Table 2.

In the $^{13}$C-N.M.R. spectra no peak revealing the presence of the —$(CH_2)_n$— sequence comprised between two tertiary carbon atoms, wherein n is an even number, was observed.

EXAMPLE 5

Operating according to the procedure described in Example 3, but in the absence of n-hexane, 718 ml of propylene and the amounts of water and ethylene reported in Table 1 were introduced in the autoclave.

The polymerization conditions are reported in Table 1. The characterization data of the polymer obtained are reported in Table 2.

In the $^{13}$C-N.M.R. spectra no peak revealing the presence of the $-(CH_2)_n-$ sequence comprised between two tertiary carbon atoms, wherein n is an even number, was observed.

COMPARATIVE EXAMPLES 1–5

It was worked according to the procedure described in Example 1, but with the difference that instead of dimethylsilandiyl-bis(fluorenyl)zirconium dichloride, ethylene-bis(tetrahydroindenyl)zirconium dichloride was used.

The polymerization conditions are reported in Table 1.

The polymerization reaction was stopped by feeding 600 cm$^3$ of CO. The solution containing the copolymer was discharged in a 5 liter recipient containing 3 liters of acetone. The solid polymer obtained was dried in an oven at 70° C.

The characterization data of the polymer obtained are reported in Table 2.

What is claimed is:

1. A copolymer of ethylene with propylene, having a content of ethylene derived units of from about 50% to 85% by mole, a content of propylene derived units of from about 15 to 50% by mole, and having the following characteristics:

(A) the % by mole content of propylene in the copolymer (%P) and the ratio EPE/(EPE+PPE+PPP), wherein EPE, PPE and PPP represent the sequences ethylene/propylene/ethylene, propylene/propylene/ethylene and propylene/propylene/propylene respectively in the copolymer, satisfy the following relationship:

0.01%P+EPE/(EPE+PPE+PPP)≧1

(B) less than 2% of the CH$_2$ groups in the polymeric chain are in sequences (CH$_2$)$_n$, wherein n is an even number.

2. A copolymer according to claim 1, having a content of units deriving from at least one polyene of from about 0 to 5% by mole.

3. A copolymer according to claim 1, in which the product of the reactivity ratios r$_1$r$_2$, wherein r$_1$ is the reactivity ratio of propylene and r$_2$ that of ethylene, is lower than 0.1.

4. A copolymer according to claim 1, having an intrinsic viscosity (η)>1.0.

5. A copolymer according to claim 1, having a ratio M$_w$/M$_n$ lower than 3.

6. An elastomeric copolymer obtained by subjecting the copolymer according to claim 1 to a vulcanization process.

7. A shaped article obtained from an elastomeric copolymer according to claim 6.

TABLE 1

| | | | | C$_2$ liq. phase | | C$_3$ liq. phase | | H$_2$ gas phase | | | | | |
|---|---|---|---|---|---|---|---|---|---|---|---|---|---|
| Example | Zr (mmols · 10$^{-3}$) | Al (mmols) | Al/H$_2$O (mol.) | (grams) | (% weight) | (grams) | (% weight) | (% mole) | P tot. (bar) | T (° C.) | Time (min) | Yield (g) | Activity (Kg$_{pol}$/g$_{Zr}$) |
| 1 | 1.82 | 1.82 | 2.0 | 218.0 | 12.0 | 278 | 15.3 | — | 17.8 | 30 | 60 | 66 | 66.0 |
| 2 | 4.92 | 4.92 | 2.0 | 94.3 | 5.57 | 278 | 16.3 | — | 9.4 | 30 | 60 | 41 | 15.2 |
| 3 | 3.25 | 3.60 | 2.0 | 22.7 | 4.0 | 82.2 | 14.5 | — | 9.0 | 40 | 60 | 54 | 30.3 |
| 4 | 7.43 | 14.86 | — | 12.1 | 2.0 | 131 | 21.7 | — | 9.0 | 50 | 170 | 16 | 3.9 |
| 5 | 3.41 | 6.82 | 2.0 | 115.3 | 24.8 | 350 | 75.2 | — | 35.2 | 40 | 60 | 135 | 72.2 |
| COMP. 1 | 1.88 | 1.67 | 1.8 | 39.4 | 2.33 | 331 | 19.6 | — | 9.0 | 50 | 60 | 35 | 43.8 |
| COMP. 2 | 1.88 | 1.88 | 2.0 | 36.75 | 2.14 | 360.7 | 21.0 | — | 9.0 | 50 | 60 | 34.5 | 43.1 |
| COMP. 3 | 1.88 | 1.67 | 1.8 | 34.6 | 2.0 | 375 | 21.7 | 0.031 | 9.0 | 50 | 60 | 40 | 50.0 |
| COMP. 4 | 1.88 | 1.88 | 2.0 | 34.6 | 2.0 | 375 | 21.7 | 0.046 | 9.0 | 50 | 60 | 37 | 46.3 |
| COMP. 5 | 1.88 | 1.67 | 1.8 | 29.9 | 1.68 | 432 | 24.2 | — | 9.0 | 50 | 60 | 31 | 181.3 |
| COMP. 6 | 1.88 | 1.67 | 1.8 | 29.9 | 1.68 | 432 | 24.2 | 0.021 | 9.0 | 50 | 60 | 31 | 181.3 |

TABLE 2

| | propylene | N.M.R. | | | | | I.V. | D.S.C. | |
|---|---|---|---|---|---|---|---|---|---|
| Example | (% mols) | EPE | PPE | PPP | EPE/(EPE + PPE + PPP) | r$_1$r$_2$ | (dl/g) | T$_f$(° C.) | ΔH$_f$(J/g) |
| 1 | 17.4 | 0.170 | 0.00581 | 0 | 0.956 | 0.0639 | 2.08 | 42.6 | 39.2 |
| 2 | 28.6 | 0.266 | 0.0206 | 0 | 0.928 | 0.0601 | 1.45 | — | 0 |
| 3 | 32.5 | 0.294 | 0.0354 | 0 | 0.883 | 0.0674 | 1.20 | 44.1 | 0.62 |
| 4 | 40.2 | 0.339 | 0.0632 | 0.00354 | 0.829 | 0.0562 | n.d. | n.d. | n.d. |
| 5 | 36.1 | 0.275 | 0.060 | 0.0260 | 0.762 | 0.150 | 0.90 | — | 0 |
| COMP. 1 | 22.6 | 0.159 | 0.0456 | 0.00845 | 0.746 | 0.512 | 5.74 | 39.4 | 11.5 |
| COMP. 2 | 24.2 | 0.171 | 0.0537 | 0.0107 | 0.725 | 0.487 | 4.91 | 37.3 | 5.3 |
| COMP. 3 | 29.1 | 0.191 | 0.0742 | 0.0194 | 0.665 | 0.456 | 2.89 | — | 0 |
| COMP. 4 | 31.3 | 0.186 | 0.0773 | 0.0243 | 0.634 | 0.506 | 2.45 | — | 0 |
| COMP. 5 | 34.7 | 0.201 | 0.0943 | 0.0341 | 0.611 | 0.453 | 3.56 | — | 0 |
| COMP. 6 | 36.2 | 0.204 | 0.106 | 0.0433 | 0.570 | 0.447 | 2.53 | — | 0 | n.d. = non determined

* * * * *